US012572469B2

(12) United States Patent
Redaelli

(10) Patent No.: US 12,572,469 B2
(45) Date of Patent: Mar. 10, 2026

(54) INDEPENDENT FLASH TRANSLATION LAYER TABLES FOR MEMORY

(71) Applicant: Micron Technology, Inc., Boise, ID (US)

(72) Inventor: Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/383,746

(22) Filed: Oct. 25, 2023

(65) Prior Publication Data

US 2024/0160566 A1 May 16, 2024

Related U.S. Application Data

(60) Provisional application No. 63/424,332, filed on Nov. 10, 2022.

(51) Int. Cl.
*G06F 12/02* (2006.01)
*G06F 11/07* (2006.01)
(52) U.S. Cl.
CPC ...... *G06F 12/0292* (2013.01); *G06F 11/0772* (2013.01); *G06F 12/0246* (2013.01); *G06F 2212/7201* (2013.01)
(58) Field of Classification Search
CPC ............. G06F 12/0292; G06F 12/0246; G06F 2212/7201; G06F 11/0772
See application file for complete search history.

(56) References Cited

U.S. PATENT DOCUMENTS

| | | | | |
|---|---|---|---|---|
| 2015/0089271 A1* | 3/2015 | Shimizu | .............. | G06F 11/2002 |
| | | | | 714/4.1 |
| 2015/0268875 A1* | 9/2015 | Jeddeloh | ................ | G11C 5/025 |
| | | | | 711/105 |
| 2015/0378642 A1* | 12/2015 | Moon | .................... | G06F 3/0619 |
| | | | | 711/162 |
| 2017/0010832 A1* | 1/2017 | Ju | ......................... | G11C 7/1072 |
| 2017/0109078 A1* | 4/2017 | Shaharabany | ........ | G06F 3/0688 |
| 2018/0024919 A1* | 1/2018 | Geml | .................... | G06F 3/0659 |
| | | | | 711/103 |
| 2018/0173619 A1* | 6/2018 | Sivasankaran | ........ | G06F 3/0679 |
| 2018/0307558 A1* | 10/2018 | Chen | ....................... | G06F 11/14 |
| 2019/0370167 A1* | 12/2019 | Widder | ................... | G06F 3/061 |
| 2019/0384706 A1* | 12/2019 | Kao | .................... | G06F 12/0868 |
| 2021/0294751 A1* | 9/2021 | Boals | .................. | G06F 11/1471 |
| 2022/0043724 A1* | 2/2022 | Lee | ......................... | G06F 12/10 |

(Continued)

*Primary Examiner* — Rocio Del Mar Perez-Velez
*Assistant Examiner* — Julian S Mendel
(74) *Attorney, Agent, or Firm* — Schwegman Lundberg & Woessner, P.A.

(57) ABSTRACT

A memory sub-system with multiple flash translation layer (FTL) tables is disclosed. A host system can utilize a memory sub-system that includes one or more memory components. The host system can provide data to be stored at the memory sub-system and can request data to be retrieved from the memory sub-system. The FTL provides several services, including translating logical addresses used by the host to physical addresses used to access physical memory. If one FTL table is corrupted, the logical-to-physical mapping of another FTL table may be used, allowing the device to continue to provide read-write access to at least a portion of the memory sub-system. Thus, by use of a secondary FTL table, the reliability of the memory sub-system is improved.

18 Claims, 6 Drawing Sheets

(56) References Cited

U.S. PATENT DOCUMENTS

2022/0197790 A1*  6/2022  Palmer ............... G06F 12/0891
2024/0028258 A1*  1/2024  Yang .................... G06F 3/0638
2024/0095163 A1*  3/2024  Kanno ............... G06F 12/1027

* cited by examiner

400

410

STORE, BY A FLASH TRANSLATION LAYER (FTL) CONTROLLER, LOGICAL-TO-PHYSICAL MAPPING DATA FOR A LOGICAL ADDRESS TO A FIRST FTL TABLE OF A PLURALITY OF FTL TABLES FOR A MEMORY SUB-SYSTEM

420

STORE, BY THE FTL CONTROLLER, LOGICAL-TO-PHYSICAL MAPPING DATA FOR THE LOGICAL ADDRESS TO A SECOND FTL TABLE OF THE PLURALITY OF FTL TABLES FOR THE MEMORY SUB-SYSTEM

500

510

PRIORITIZE, BY A FLASH TRANSLATION LAYER (FTL) CONTROLLER, A FIRST FTL TABLE OF A PLURALITY OF FTL TABLES FOR A MEMORY SUB-SYSTEM

520

IN RESPONSE TO DETERMINING THAT THE FIRST FTL TABLE IS CORRUPTED, USE A SECOND FTL TABLE OF THE PLURALITY OF FTL TABLES INSTEAD OF THE FIRST FTL TABLE

INDEPENDENT FLASH TRANSLATION LAYER TABLES FOR MEMORY

PRIORITY APPLICATION

This application claims the benefit of priority to U.S. Provisional Application Ser. No. 63/424,332, filed Nov. 10, 2022, which is incorporated herein by reference in its entirety.

TECHNICAL FIELD

The present disclosure generally relates to memory sub-systems and, more specifically, to flash translation layers (FTLs) for memory sub-systems.

BACKGROUND

A memory sub-system can be a storage system, such as a solid-state drive (SSD), and can include one or more memory components that store data. The memory components can be, for example, non-volatile memory components and volatile memory components. The memory components can be affixed to a printed circuit board (PCB). In general, a host system can utilize a memory sub-system to store data at the memory components and to retrieve data from the memory components.

A FTL performs logical-to-physical address translation, garbage collection, wear-leveling, page allocation, and bad block management. A file system uses logical addresses to identify data, but physical addresses are used by the non-volatile memory. At different times, the same logical address may be associated with different physical addresses. The change in mapping is reflected by updating an FTL table.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to a memory sub-system with multiple FTL tables. In general, a host system can utilize a memory sub-system that includes one or more memory components. The host system can provide data to be stored at the memory sub-system and can request data to be retrieved from the memory sub-system. An FTL can include circuitry configured to provide memory device services, including translating logical addresses used by the host to physical addresses used to access physical memory. In a system with a single FTL table, corruption of the FTL table can lead to errors in the logical-to-physical address translation, resulting in incorrect data being read or modified in response to host commands. Accordingly, if the single FTL table is corrupted and cannot be recovered, the memory sub-system may be put into a write-protect (WP #) mode, in which data can be read but not written. The WP #mode may prevent further corruption of data, but reduces the usability of the memory sub-system.

As discussed herein, some memory systems can include or use multiple FTL tables. If one FTL table is corrupted in a system with multiple FTL tables, then the logical-to-physical mapping of another or secondary FTL table may be used, allowing the device to continue to provide read-write access to at least a portion of the memory sub-system. Thus, by use of a secondary FTL table, the reliability of the memory sub-system is improved. Some other methods to improve reliability include adding a separate memory to store FTL data, such as NOR flash. By comparison with devices that use such a separate memory, the present solution reduces cost and complexity by using the existing memory components to store redundant FTL data.

In a system with multiple FTL tables, a memory sub-system may select a particular FTL table to use at boot time. If a primary FTL table is functioning correctly, the primary FTL table is used. If the primary FTL table is not functioning correctly, a secondary FTL table is used. The secondary FTL table may include a subset of the logical-to-physical mapping data of the primary FTL table. For example, the primary FTL table may include logical-to-physical mapping data for the entire memory of the memory sub-system while the secondary FTL table includes logical-to-physical mapping data for less than all of the memory of the memory sub-system.

Figure 1:
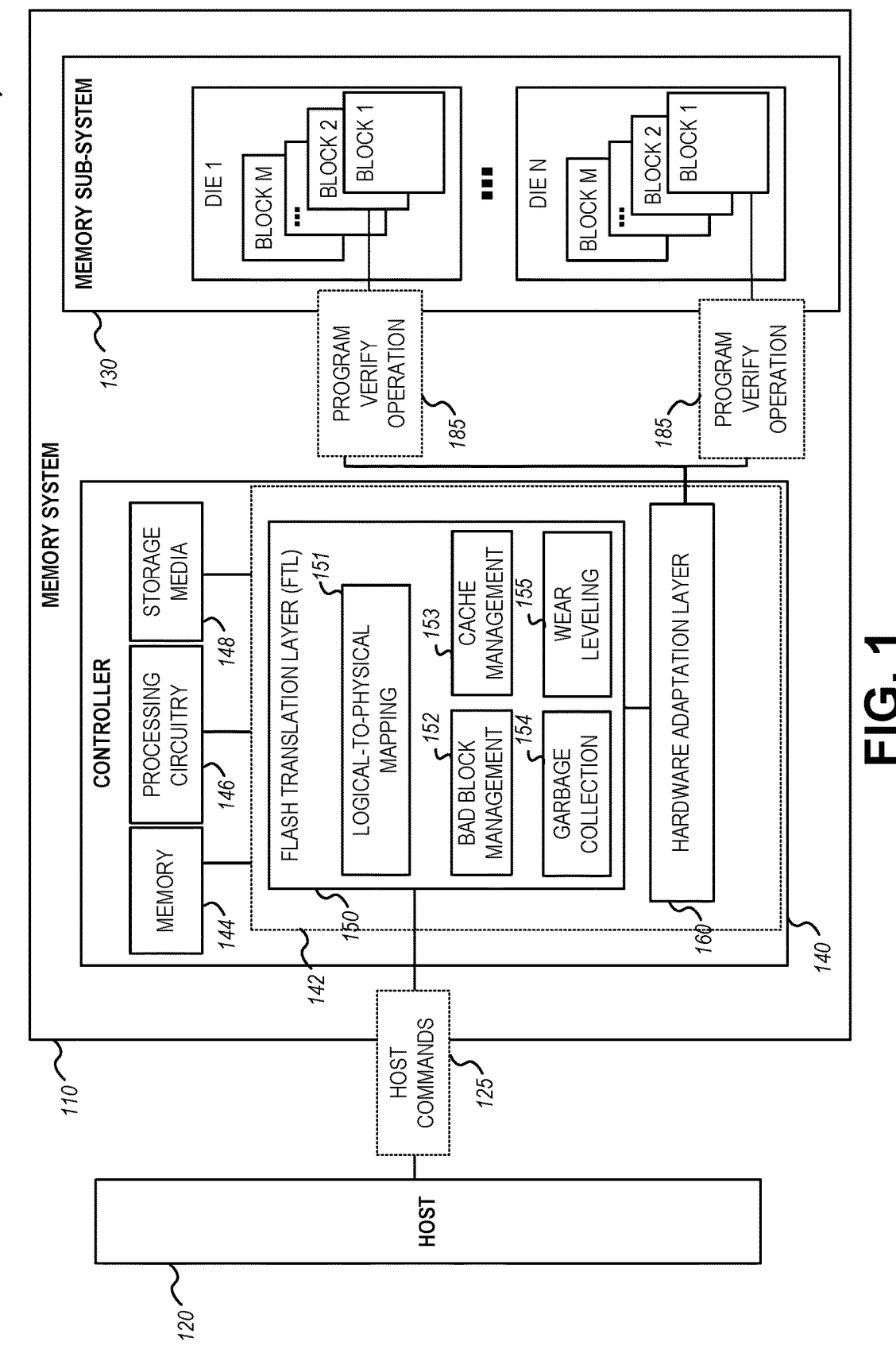
FIG. 1 is a block diagram of an example system including a memory sub-system adapted using multiple FTL tables for non-volatile memory.

FIG. 1 is a block diagram of an example system 100 including a memory sub-system adapted for using multiple FTL tables for non-volatile memory. The example system 100 includes a memory system 110 (e.g., a SSD storage device, a secure digital (SD) card, a multimedia card (MMC), and the like) having a memory controller 140 with control modules 142 adapted for using the multiple FTL tables, discussed herein. In an example, the functionality of the control modules 142 may be implemented in respective modules in a firmware of the memory controller 140. However, it will be understood that various forms of software, firmware, and hardware may be utilized by the controller 140 to implement the control modules 142 (e.g., to implement the functionality of a program control) and the other techniques discussed herein.

A memory system 110 includes a memory sub-system 130 (e.g., a NAND memory sub-system or other non-volatile memory) with multiple dies (dies 1-N), with each die including one or more blocks (blocks 1-M). Each of the one or more blocks may include further divided portions, such as one or more wordlines (not shown) per block. Each of the one or more wordlines may be further comprised of one or more pages (not shown) per wordline, depending on the number of data states that the memory cells of that wordline are configured to store. Each die may be a NAND memory chip.

In an example, the blocks of memory cells of the memory sub-system 130 include groups of at least one of: single-level cell (SLC), multi-layer cell (MLC), triple-layer cell (TLC), or quad-layer cell (QLC) NAND memory cells.

Also, in an example, the memory sub-system 130 can be arranged into a stack of 3D NAND dies. These configurations and further detailed components of the memory sub-system 130 are not illustrated in FIG. 1 for simplicity. However, the memory sub-system 130 may incorporate these or any of the features described above with reference to features of 3D NAND architecture devices or other forms of NAND storage devices.

In 3D architecture semiconductor memory technology, vertical structures are stacked, increasing the number of tiers, physical pages, and accordingly, the density of a memory sub-system (e.g., a storage device). In an example, the memory system 110 can be a discrete memory or storage device component of the host device 120. In other examples, the memory system 110 can be a portion of an integrated circuit (e.g., system on a chip (SOC), etc.), stacked, or otherwise included with one or more other components of the host device 120.

Each flash memory cell in a NAND architecture semiconductor memory array may be programmed to two or more programmed states. For example, an SLC may represent one of two programmed states (e.g., 1 or 0), representing one bit of data. Flash memory cells may represent more than two programmed states, allowing the manufacture of higher density memories without increasing the number of memory cells, as each cell may represent more than one binary digit (e.g., more than one bit). Such cells may be referred to as multi-state memory cells, multi-digit cells, or MLCs. In certain examples, MLC may refer to a memory cell that may store two bits of data per cell (e.g., one of four programmed states), TLC may refer to a memory cell that may store three bits of data per cell (e.g., one of eight programmed states), and a QLC may store four bits of data per cell. MLC is used herein in its broader context, to refer to any memory cell(s) that may store more than one bit of data per cell (i.e., that may represent more than two programmed states; thus, the term MLC is used herein in the broader context, to be generic to memory cells storing 2, 3, 4, or more bits of data per cell).

The memory system 110 is shown as being operably coupled to a host device 120 via a controller 140 of the memory sub-system. The controller 140 is adapted to receive and process host input/output (TO) commands 125, such as read operations, write operations, erase operations, and the like, to read, write, erase, and manage data stored within the memory sub-system 130. In other examples, the memory controller 140 may be physically separate from an individual memory sub-system, and may receive and process commands for one or more individual memory sub-systems. A variety of other components for the memory system 110 (such as a memory manager, and other circuitry or operational components) and the controller 140 are also not depicted.

The controller 140 is depicted as including a memory 144 (e.g., volatile memory), processing circuitry 146 (e.g., a microprocessor), and a storage media 148 (e.g., non-volatile memory), used for executing instructions (e.g., instructions hosted by the storage media 148, loaded into memory 144, and executed by the processing circuitry 146) to implement the control modules 142 for management and use of the memory sub-system 130. The control modules 142 may include, but are not limited to, a FTL 150 and a hardware adaptation layer 160.

Some types of memory (e.g., NAND flash memory) do not support overwriting data in place. For these types of memory, a physical storage location for data must be erased before new data can be written to that location. To avoid waiting for the longer erase cycle to complete each time a write is performed, data is written to a different physical location and the original physical location storing the data is marked for erasure. After being erased, the original physical location can be used again to store data. This means that the physical location associated with a logical address changes each time the logical address is written to. The FTL 150 hides the complexity of these types of memory by providing a logical block interface to the memory sub-system.

The FTL 150 can comprise general purpose or purpose-built circuitry or components configured to perform logical-to-physical address translation using a logical-to-physical mapping 151. In an example, the logical-to-physical mapping 151 includes or uses a look-up table of addresses. In an example, the FTL 150 may include circuitry configured to perform any one or more of bad block management 152, cache management 153, garbage collection 154, wear-leveling 155, or any suitable combination thereof. In an example, the circuitry configured to perform garbage collection 154 erases blocks that have been marked for erasure (also referred to as "dirty blocks"). Before all blocks of the memory sub-system 130 are written, new writes may immediately be performed on unused blocks. After all blocks are written, no additional writes may be performed until garbage collection 154 converts dirty blocks to unused blocks.

Some types of memory (e.g., NAND flash memory) have a limited number of program/erase cycles before the memory becomes unusable. To increase the lifetime of the memory sub-system 130 at its full capacity, the circuitry configured to perform wear-leveling 155 manipulates the physical locations associated with logical addresses to evenly wear out the physical memory locations. Despite the wear-leveling 155, some memory blocks will eventually wear out. These worn-out blocks are referred to as "bad blocks." In some examples, blocks may be found to be non-functional during the manufacturing process and marked as bad blocks before the device is provided to an end user. The circuitry configured to perform bad block management 152 ensures that data is not written to the bad blocks.

The circuitry configured to perform cache management 153 determines which portions of the FTL logical-to-physical mapping table are stored in cache memory (e.g., the memory 144). The entirety of the FTL logical-to-physical mapping table can be stored in the memory sub-system 130. As discussed herein, multiple copies of the FTL logical-to-physical mapping table, in whole or in part, may be stored in the memory sub-system 130, allowing the FTL 150 to continue to operate even if one of the FTL tables becomes corrupted. The multiple FTL tables may be stored on different dies of the memory sub-system 130, providing redundancy if an entire die becomes inoperable.

One or more communication interfaces can be used to transfer the host commands 125 between the memory system 110 and one or more other components of the host device 120, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 120 can include a host system, an electronic device, a processor, a memory card reader, or one or more other electronic devices external to the memory system 110. In some examples, the host device 120 may be a machine having some portion, or all, of the components discussed in reference to the machine 600 of FIG. 6.

The hardware adaptation layer 160 provides device-specific control of the memory sub-system 130. Thus, the same FTL 150 may be configured to interface with different physical devices by adjusting or updating the hardware adaptation layer 160. The hardware adaptation layer 160 may include an error correction code (ECC) component, which can include, among other things, an ECC engine or other circuitry configured to detect or correct errors associated with writing data to or reading data from one or more memory cells of the memory sub-system 130 coupled to the memory controller 140. The memory controller 140 can be configured to actively detect and recover from error occurrences (e.g., bit errors, operation errors, etc.) associated with various operations or storage of data, while maintaining integrity of the data transferred between the host device 120 and the memory system 110, or maintaining integrity of stored data (e.g., using redundant array of inexpensive disc (RAID) storage, etc.), and can remove (e.g., retire) failing memory resources (e.g., memory cells, memory arrays, pages, blocks, etc.) to prevent future errors.

The hardware adaptation layer 160 may include, among other things, circuitry or components (hardware and/or software) configured to control memory operations associated with writing data to, reading data from, or erasing one or more memory cells of the memory sub-system 130 coupled to the memory controller 140. In an example, the hardware adaptation layer 160 operates to identify parameters in the memory sub-system 130 and controller 140 for scheduling and conducting a program verify operation 185. The hardware adaptation layer 160 further operates to initiate and perform the program verify operation 185 based on these or other parameters, through synchronous or asynchronous event processing.

The memory sub-system 130 can include several memory cells arranged in, for example, a number of devices, planes, sub-blocks, blocks, or pages. As one example, a 48 GB TLC NAND memory sub-system can include 18,592 bytes (B) of data per page (16,384+2208 bytes), 1536 pages per block, 548 blocks per plane, and 4 or more planes per device. As another example, a 32 GB MLC memory sub-system (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory sub-system. Other examples can include other numbers or arrangements. In some examples, a memory sub-system, or a portion thereof, may be selectively operated in SLC mode or in a desired MLC mode (such as TLC, QLC, etc.).

In operation, data is typically written to or read from the memory system 110 in pages and erased in blocks. However, one or more memory operations (e.g., read, write, erase, etc.) can be performed on larger or smaller groups of memory cells, as desired. The data transfer size of the memory system 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory sub-systems 130 can provide for different page sizes or may require different amounts of metadata associated therewith. For example, different memory sub-system types may have different bit error rates, which can lead to different amounts of metadata necessary to ensure integrity of the page of data (e.g., a memory sub-system with a higher bit error rate may require more bytes of error correction code data than a memory sub-system with a lower bit error rate). As an example, a MLC NAND flash device may have a higher bit error rate than a corresponding SLC NAND flash device. As such, the MLC device may require more metadata bytes for error data than the corresponding SLC device.

Figure 2:
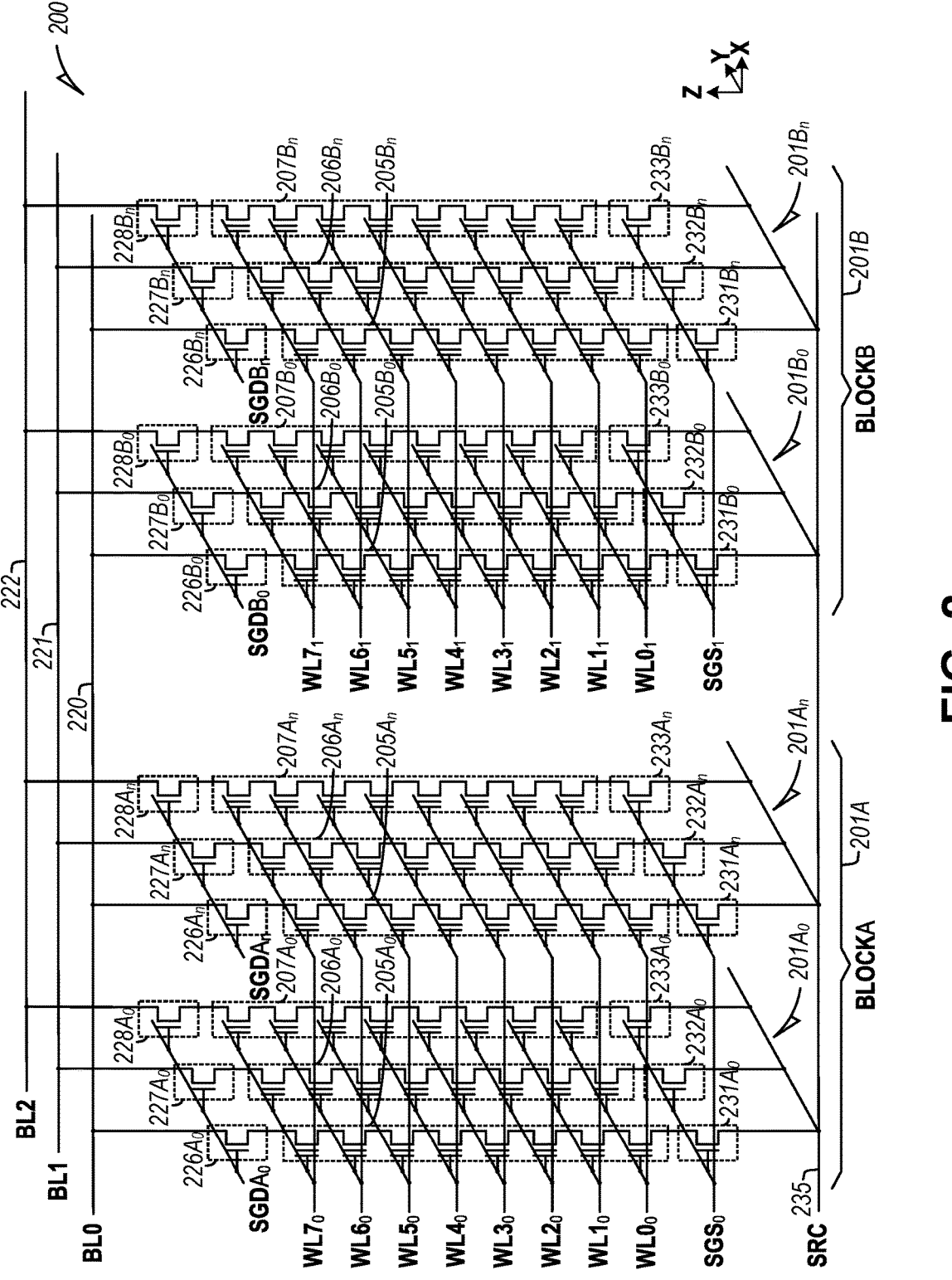
FIG. 2 illustrates a schematic diagram of an example of a three-dimensional (3D) NAND architecture semiconductor memory array.

FIG. 2 illustrates an example schematic diagram of a 3D NAND architecture semiconductor memory array 200 including a number of strings of memory cells (e.g., first-third A0 memory strings 205A0-207A0, first-third An memory strings 205An-207An, first-third B0 memory strings 205B0-207B0, first-third Bn memory strings 205Bn-207Bn, etc.), organized in blocks (e.g., block A 201A, block B 201B, etc.) and sub-blocks (e.g., sub-block A0 201A0, sub-block An 201An, sub-block B0 201B0, sub-block Bn 201Bn, etc.). The memory array 200 represents a portion of a greater number of similar structures than would typically be found in a block, device, or other unit of a memory sub-system.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third A0 SGS 231A0-233A0, first-third An SGS 231An-233An, first-third B0 SGS 231B0-233B0, first-third Bn SGS 231Bn-233Bn, etc.) and a drain-side select gate (SGD) (e.g., first-third A0 SGD 226A0-228A0, first-third An SGD 226An-228An, first-third B0 SGD 226B0-228B0, first-third Bn SGD 226Bn-228Bn, etc.). Each string of memory cells in the 3D memory array can be arranged along the X direction as data lines (e.g., bitlines (BL) BL0 220, BL1 221, BL2 222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory sub-system can include 18,592 bytes (B) of data per page (16,384+2208 bytes), 1536 pages per block, 548 blocks per plane, and 4 or more planes per device.

In an example, the memory array 200 can include a number of levels of semiconductor material (e.g., polysilicon, etc.) configured to couple the CGs of each memory cell or select gate (or a portion of the CGs or select gates) of a respective tier of the array. Specific strings of memory cells in the array can be accessed, selected, or controlled using a combination of bitlines (BLs) and select gates, etc., and specific memory cells at one or more tiers in the specific strings can be accessed, selected, or controlled using one or more access lines (e.g., wordlines).

Figure 3:
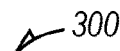
FIG. 3 illustrates data stored in non-volatile memory of an example memory sub-system with multiple FTL tables.
Figure 3:
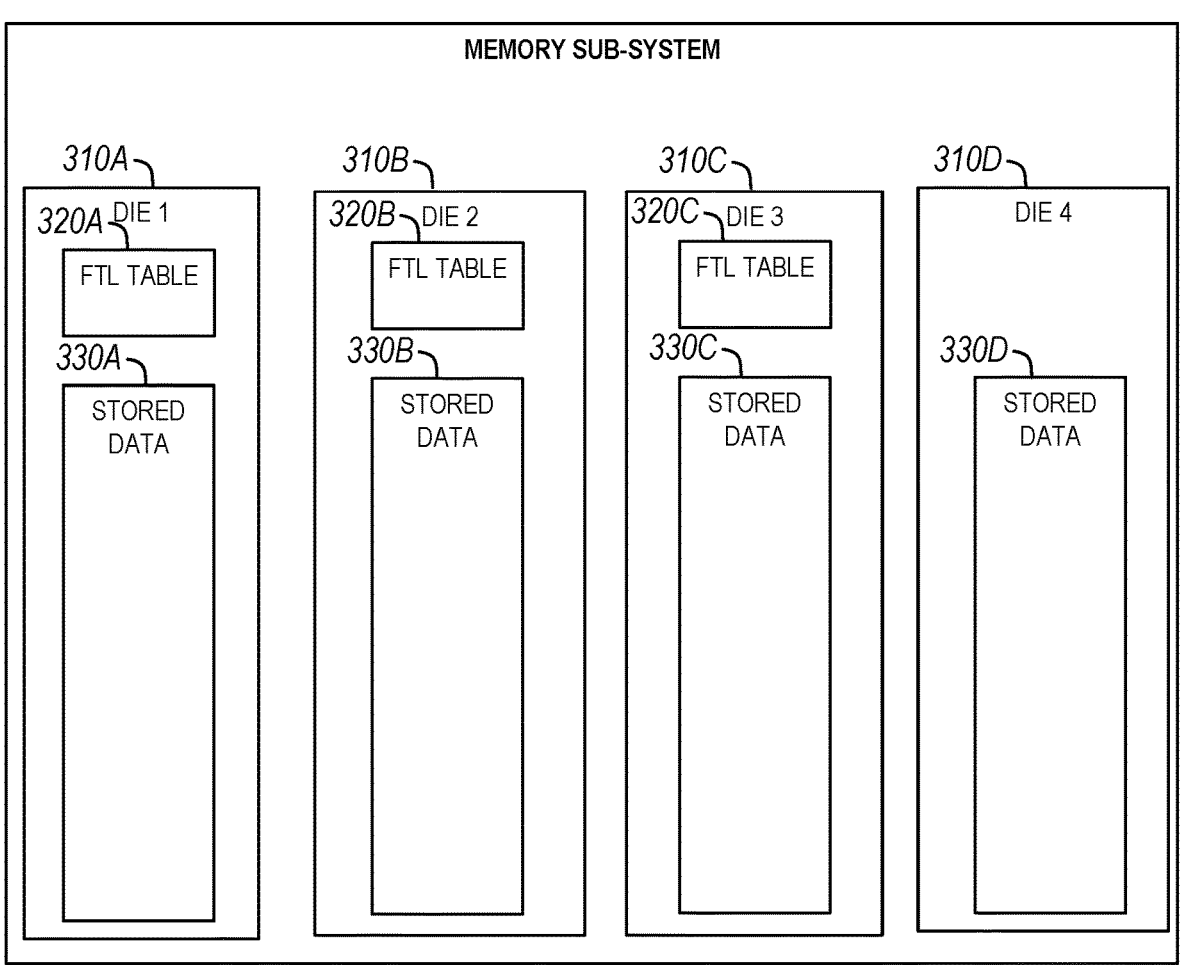

FIG. 3 illustrates data stored in non-volatile memory of an example memory sub-system 300 in accordance with using multiple FTLs. The memory sub-system 300 includes four dies 310A, 310B, 310C, and 310D. Each of the dies 310A-310D stores data (i.e., stored data 330A, 330B, 330C, and 330D). Additionally, more than one of the dies 310A-310D includes an FTL table (i.e., FTL tables 320A, 320B, and 320C). Accordingly, if a primary FTL table (e.g., the FTL table 320A) should become corrupted, then a secondary FTL table (e.g., the FTL table 320B) can be used. Each of the FTL tables 320A-320C may include a logical-to-physical mapping table. As a result, operation of the memory sub-system 300 may proceed without interruption if fewer than all of the FTL tables become corrupted.

Further fallback FTL tables may be used, such as the FTL table 320C, allowing operation to proceed even if both the primary and the secondary FTL tables become corrupted. The example of FIG. 3 shows four dies 310A-310D and three FTL tables 320A-320C, but any number of dies and FTL tables are contemplated. For example, eight dies and two FTL tables or sixteen dies and sixteen FTL tables may be used.

A particular one of the FTL tables 320A-320C may be selected by the host device 120 of FIG. 1 when initializing the memory sub-system 130. For example, during a normal boot sequence for the host device 120, the memory sub-system 130 may be configured to use the FTL table 320A and during an emergency boot sequence, the memory sub-system 130 may be configured to use the FTL table 320B instead.

In some example embodiments, all FTL tables 320A-320C include logical-to-physical address mapping data for the same range of addresses. In these example embodiments, access to all logical addresses may be maintained so long as fewer than all of the FTL tables 320A-320C are corrupted.

In other example embodiments, all FTL tables 320A-320C include logical-to-physical address mapping data for a common subset of the logical addresses supported by the memory sub-system 300 and at least one of the FTL tables 320A-320C contains logical-to-physical address mapping data for logical addresses not mapped by at least one other of the FTL tables 320A-320C. For example, the FTL table 320A may contain logical-to-physical mapping data for logical addresses in the range 0x0000-0xFFFF, the FTL table 320B may contain logical-to-physical mapping data for logical addresses in the range 0x0000-0xA000, and the FTL table 320C may contain logical-to-physical mapping data for logical addresses in the range 0x0000-0x8000. As a result, if the FTL table 320A is the primary FTL table, the FTL table 320B is the secondary FTL table, and the FTL table 320C is the tertiary FTL table, access to addresses in the range 0x0000-0x8000 will continue unless all three FTL tables 320A-320C are corrupted; access to addresses in the range 0x8000-0xA000 will continue if the FTL table 320A is corrupted so long as the FTL table 320B is not corrupted; and access to addresses in the range 0xA000-0xFFFF is available only while the FTL table 320A is not corrupted.

Figure 4:
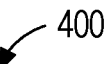
FIG. 4 is a flow diagram of an example method to use multiple FTL tables, in accordance with some embodiments of the present disclosure.

FIG. 4 is a flow diagram of an example method 400 to use multiple FTLs, in accordance with some embodiments of the present disclosure. The method 400 includes steps 410 and 420.

In step 410, an FTL stores logical-to-physical mapping data for a logical address to a first FTL table of a plurality of FTL tables for a memory sub-system. For example, the memory sub-system 130 of FIG. 1 may be implemented as shown in FIG. 3, with FTL tables 320A-320C. The FTL may store logical-to-physical mapping data for a particular logical address to a first FTL table in the FTL table 320A.

The FTL, in step 420, stores logical-to-physical mapping data for the logical address to a second FTL table of the plurality of FTL tables for a memory sub-system. For example, the FTL may store logical-to-physical mapping data for the particular logical address to a second FTL table in the FTL table 320B.

According to the method 400, logical-to-physical mapping data is stored in multiple FTL tables, allowing the logical-to-physical mapping data to be accessed if one of the FTL tables is partially or wholly corrupted. The storing of the logical-to-physical mapping data may be repeated any number of additional times for additional redundancy (i.e., allowing for N−1 failures where N copies of the data are made for any value of N>=2).

Based on the logical address, the FTL may be configured to store logical-to-physical mapping data for the logical address to only one of the plurality of FTL tables. Thus, step 420 may be selectively performed based on the logical address such that some logical-to-physical mapping data is stored only in the first FTL table and some is stored both in the first FTL table and the second FTL table. For example, the second FTL table may store logical-to-physical mapping data for only particular critical functions of a device, allowing more memory to be used for storing data instead of FTL tables.

In some example embodiments, the second FTL table stores logical-to-physical mapping data for a strict subset of logical-to-physical mapping data stored by the first FTL table. In other example embodiments, the second FTL table stores logical-to-physical mapping data for some logical addresses also mapped by the first FTL table and some logical addresses not mapped by the first FTL table. The first and second FTL tables may be the same size (storing logical-to-physical mapping data for the same number of logical addresses) or different sizes. A set is a subset of another set if every member of the set is also a member of the other set. A set is a strict subset of another set if it is a subset of the other set and does not contain every element of the other set.

Figure 5:
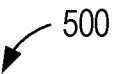
FIG. 5 is a flow diagram of an example method to use multiple FTL tables, in accordance with some embodiments of the present disclosure.

FIG. 5 is a flow diagram of an example method 500 to use multiple FTLs, in accordance with some embodiments of the present disclosure. The method 500 includes steps 510 and 520.

In step 510, an FTL prioritizes a first FTL table of a plurality of FTL tables for a memory sub-system. For example, the controller 140 of FIG. 1 may prioritize the FTL table 320A of FIG. 3. The prioritized FTL table will be used to determine logical-to-physical mapping data by default.

The FTL, in step 520, in response to determining that the first FTL table is corrupted, uses a second FTL table of the plurality of FTL tables instead of the first FTL table. For example, a number of ECC errors that exceeds a predetermined threshold may be encountered when accessing the FTL table 320A. Based on the number of ECC errors and the predetermined threshold, the controller 140 may determine that the FTL table 320A is corrupted. In response, the controller 140 may use the FTL table 320B instead of the prioritized FTL table. If the FTL table 320B were not available (e.g., because it is also corrupted or in an alternative design in which only one FTL table were stored), the memory sub-system 300 may be placed in a write protect mode. Thus, the FTL table 320B is prioritized instead of placing the memory sub-system 300 into a write protect mode.

The FTL, in response to determining that the first FTL table is corrupted may also notify the host device 120. Thus, the host device 120 is enabled to communicate the corruption of the first FTL table to a server or a user of the host device 120.

Thus, by use of the method 500, logical-to-physical mapping data is accessed from multiple FTL tables, allowing the memory sub-system to continue operation even if one of the FTL tables is corrupted. Step 520 may be repeated any number of additional times if the second (or further fallback) FTL also becomes corrupted.

To better illustrate the methods and apparatuses described herein, a non-limiting set of Example embodiments are set forth below as numerically identified Examples.

Example 1 is a memory sub-system, comprising: one or more non-volatile memories, the one or more non-volatile memories storing a plurality of flash translation layer (FTL) tables that map logical addresses to physical addresses; and an FTL configured to store logical-to-physical mapping data for a logical address to at least two of the plurality of FTL tables.

In Example 2, the subject matter of Example 1, wherein the FTL is configured to store logical-to-physical mapping data for a second logical address to one of the plurality of FTL tables without storing logical-to-physical mapping data for the second logical address in any other of the plurality of FTL tables.

In Example 3, the subject matter of Examples 1-2, wherein: the one or more non-volatile memories are a plurality of non-volatile memories; and each of the plurality of FTL tables is stored on a different one of the plurality of non-volatile memories.

In Example 4, the subject matter of Examples 1-3, wherein the FTL is configured to prioritize a first FTL table for retrieving logical-to-physical mapping data.

In Example 5, the subject matter of Example 4, wherein the FTL is configured to prioritize a second FTL table in response to determining that the first FTL table is corrupted.

In Example 6, the subject matter of Example 5, wherein the FTL is further configured to notify a host in response to the determining that the first FTL table is corrupted.

In Example 7, the subject matter of Examples 5-6, wherein the prioritizing of the second FTL table is instead of placing the memory sub-system in a write protect mode.

In Example 8, the subject matter of Examples 5-7, wherein the second FTL table stores logical-to-physical mapping data for a strict subset of logical-to-physical mapping data stored by the first FTL table.

In Example 9, the subject matter of Examples 1-8, wherein the plurality of FTL tables comprise a plurality of sizes.

In Example 10, the subject matter of Examples 1-9, wherein the one or more non-volatile memories comprise a plurality of NAND memory chips.

Example 11 is a method comprising: storing, by a flash translation layer (FTL) controller, logical-to-physical mapping data for a logical address to a first FTL table of a plurality of FTL tables for a memory sub-system; and storing, by the FTL, logical-to-physical mapping data for the logical address to a second FTL table of the plurality of FTL tables for the memory sub-system.

In Example 12, the subject matter of Example 11 includes storing logical-to-physical mapping data for a second logical address to only the first FTL table.

In Example 13, the subject matter of Examples 11-12, wherein: each of the plurality of FTL tables is stored on a different non-volatile memory die of a plurality of non-volatile memory dies.

In Example 14, the subject matter of Example 13, wherein the plurality of non-volatile memories comprise a plurality of NAND memory chips.

In Example 15, the subject matter of Examples 11-14 includes, prioritizing, by the FTL, the first FTL table for retrieving logical-to-physical mapping data.

In Example 16, the subject matter of Example 15 includes prioritizing, by the FTL, the second FTL table in response to determining that the first FTL table is corrupted.

In Example 17, the subject matter of Example 16 includes notifying, by the FTL, a host in response to the determining that the first FTL table is corrupted.

In Example 18, the subject matter of Examples 15-17, wherein the prioritizing of the second FTL table includes avoiding placing the memory sub-system in a write protect mode.

In Example 19, the subject matter of Examples 15-18, wherein the second FTL table stores logical-to-physical mapping data for a strict subset of logical-to-physical mapping data stored by the first FTL table.

In Example 20, the subject matter of Examples 14-19, wherein the plurality of FTL tables comprise a plurality of sizes.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement any of Examples 1-20.

Example 24 is a method to implement any of Examples 1-20.

Figure 6:
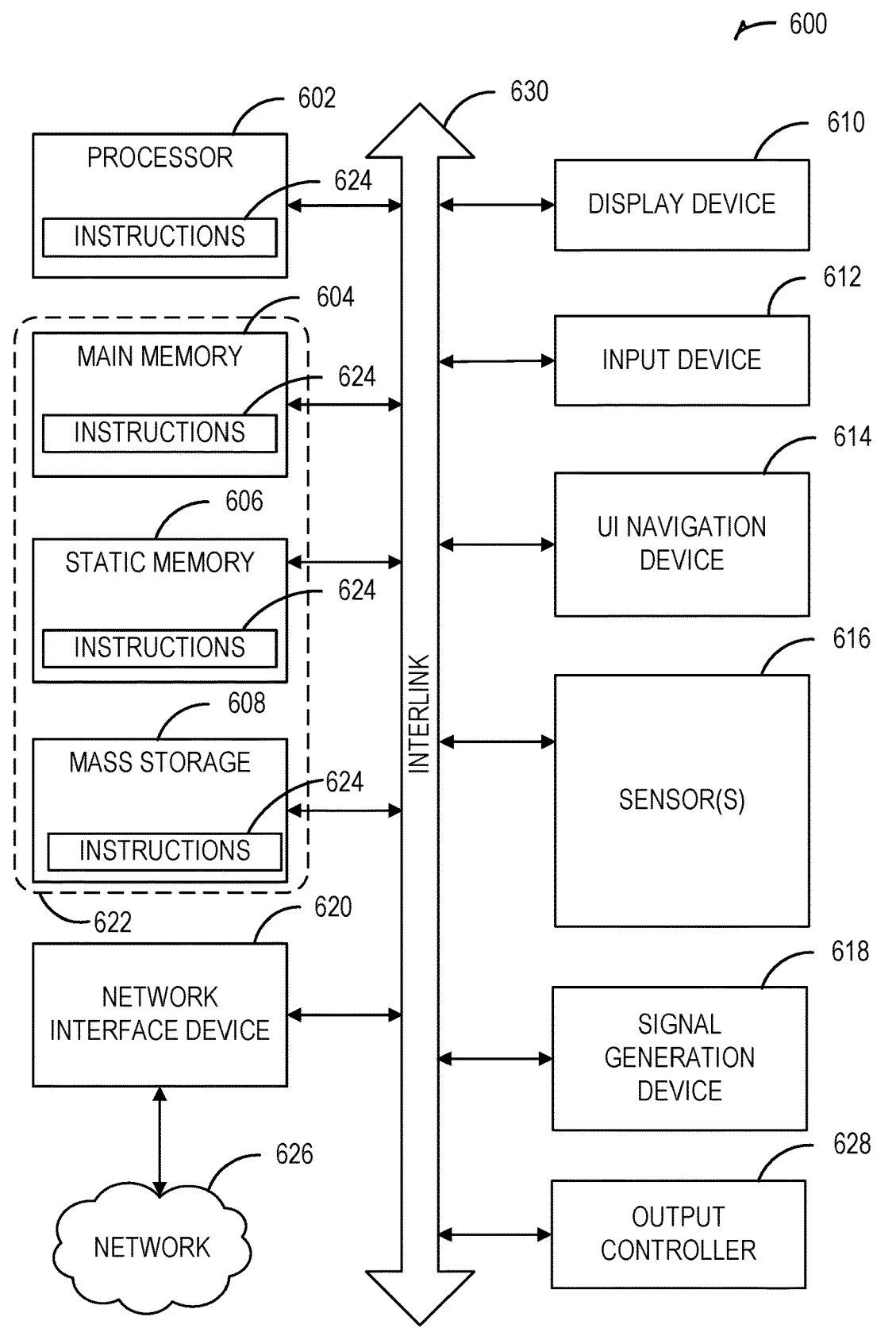
FIG. 6 illustrates an example machine of a computer system within which a set of instructions can be executed for causing the machine to perform any one or more of the methodologies discussed herein.

FIG. 6 illustrates an example machine of a machine 600 within which a set of instructions can be executed for causing the machine to perform any one or more of the methodologies discussed herein. In some embodiments, the machine 600 can correspond to a host system that includes, is coupled to, or utilizes a memory sub-system (e.g., the memory sub-system 100 of FIG. 1) or can be used to perform the operations of a controller (e.g., to execute an operating system to execute instructions 624 for reading a physical address using a write temperature data and/or generating a write temperature data while writing to a physical address). In an example, the controller can include an FTL configured to store logical-to-physical mapping data in one or more FTL tables. The instructions 624 may include, for example, instructions 624 and/or logic described herein. In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

FIG. 6 illustrates a block diagram of an example machine 600 with which, in which, or by which any one or more of the techniques (e.g., methodologies) discussed herein can be implemented. Examples, as described herein, can include, or can operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 600.

In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a PC, a tablet PC, a STB, a PDA, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 600 (e.g., computer system) can include a hardware processor 602 (e.g., a central processing unit (CPU), a graphics processing unit (GPU), a hardware processor core, or any combination thereof), a main memory 604, a static memory 606 (e.g., memory or storage for firmware, microcode, a basic-input-output (BIOS), unified extensible firmware interface (UEFI), etc.), and mass storage device 608 (e.g., hard drives, tape drives, flash storage, or other block devices) some or all of which can communicate with each other via an interlink 630 (e.g., bus). The machine 600 can further include a display device 610, an alphanumeric input device 612 (e.g., a keyboard), and a user interface (UI) navigation device 614 (e.g., a mouse). In an example, the display device 610, the input device 612, and the UI navigation device 614 can be a touch screen display. The machine 600 can additionally include a signal generation device 618 (e.g., a speaker), a network interface device 620, and one or more sensor(s) 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 602, the main memory 604, the static memory 606, or the mass storage device 608 can be, or include, a machine-readable media 622 on which is stored one or more sets of data structures or instructions 624 (e.g., software) embodying or used by any one or more of the techniques or functions described herein. The instructions 624 can also reside, completely or at least partially, within any of registers of the hardware processor 602, the main memory 604, the static memory 606, or the mass storage device 608 during execution thereof by the machine 600. In an example, one or any combination of the hardware processor 602, the main memory 604, the static memory 606, or the mass storage device 608 can constitute the machine-readable media 622. While the machine-readable media 622 is illustrated as a single medium, the term "machine-readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory sub-systems (e.g., electrically programmable read-only memory (EPROM), electrically erasable programmable read-only memory (EEPROM)) and flash memory sub-systems; magnetic disks, such as internal hard disks and removable disks; magneto-optical disks; and CD-ROM and DVD-ROM disks.

In an example, information stored or otherwise provided on the machine-readable media 622 can be representative of the instructions 624, such as instructions 624 themselves or a format from which the instructions 624 can be derived.

This format from which the instructions 624 can be derived can include source code, encoded instructions (e.g., in compressed or encrypted form), packaged instructions (e.g., split into multiple packages), or the like. The information representative of the instructions 624 in the machine-readable media 622 can be processed by processing circuitry into the instructions to implement any of the operations discussed herein. For example, deriving the instructions 624 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 can include assembly, compilation, or interpretation of the information (e.g., by the processing circuitry) to create the instructions 624 from some intermediate or preprocessed format provided by the machine-readable media 622. The information, when provided in multiple parts, can be combined, unpacked, and modified to create the instructions 624. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, compiled, or interpreted (e.g., into a library, stand-alone executable etc.) at a local machine, and executed by the local machine.

The instructions 624 can be further transmitted or received over a communications network 626 using a transmission medium via the network interface device 620 utilizing any one of a number of transfer protocols (e.g., frame relay, internet protocol, transmission control protocol (TCP), user datagram protocol (UDP), hypertext transfer protocol (HTTP), etc.). Example communication networks can include a LAN, a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, P2P networks, among others. In an example, the network interface device 620 can include one or more physical jacks (e.g., Ethernet, coaxial, or phone jacks) or one or more antennas to connect to the network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system, comprising:
a first non-volatile memory that stores a first flash translation layer (FTL) table that contains logical-to-physical mapping data for logical addresses in a first range;
a second non-volatile memory that stores a second FTL table that contains logical-to-physical mapping data for logical addresses in a second range that includes all of the logical addresses in the first range and at least one logical address not included in the first FTL table; and
a third non-volatile memory that stores a third FTL table that contains logical-to-physical mapping data for logical addresses in a third range that includes all of the logical addresses in the second range and at least one logical address not included in the second FTL table.

2. The memory sub-system of claim 1, wherein an FTL prioritizes the third FTL table for retrieving logical-to-physical mapping data.

3. The memory sub-system of claim 2, wherein the FTL prioritizes the second FTL table in response to determining that the third FTL table is corrupted.

4. The memory sub-system of claim 3, wherein the FTL is further configured to notify a host in response to the determining that the third FTL table is corrupted.

5. The memory sub-system of claim 3, wherein the prioritizing of the second FTL table is instead of placing the memory sub-system in a write protect mode.

6. The memory sub-system of claim 1, wherein the first non-volatile memory comprises a NAND memory chip.

7. The memory sub-system of claim 1, further comprising a fourth non-volatile memory that does not store any FTL tables.

8. The memory sub-system of claim 1, wherein an FTL controller prioritizes the third FTL table for retrieving logical-to-physical mapping data during a normal boot sequence and prioritizes the first FTL table for retrieving logical-to-physical mapping data during an emergency boot sequence.

9. The memory sub-system of claim 3, wherein the FTL determines that the third FTL table is corrupted based on a number of error correction code (ECC) errors encountered when accessing the third FTL table and a predetermined threshold.

10. A method comprising:
storing, by a flash translation layer (FTL) controller to a first non-volatile memory, a first FTL table that contains logical-to-physical mapping data for logical addresses in a first range;

storing, by the FTL controller to a second non-volatile memory, a second FTL table that contains logical-to-physical mapping data for logical addresses in a second range that includes all of the logical addresses in the first range and at least one logical address not included in the first FTL table;
storing, by the FTL controller to a third non-volatile memory, a third FTL table that contains logical-to-physical mapping data for logical addresses in a third range that includes all of the logical addresses in the second range and at least one logical address not included in the second FTL table; and
prioritizing, by the FTL controller, the third FTL table for retrieving logical-to-physical mapping data.

11. The method of claim 10, wherein the first non-volatile memory comprises a NAND memory chip.

12. The method of claim 10, further comprising:
prioritizing, by the FTL controller, the third FTL table for retrieving logical-to-physical mapping data.

13. The method of claim 12, further comprising:
prioritizing, by the FTL controller, the second FTL table in response to determining that the third FTL table is corrupted.

14. The method of claim 13, further comprising:
notifying, by the FTL controller, a host in response to the determining that the third FTL table is corrupted.

15. The method of claim 13, wherein the prioritizing of the second FTL table includes avoiding placing a memory sub-system in a write protect mode.

16. The method of claim 10, wherein the FTL controller further controls a fourth non-volatile memory that does not store any FTL tables.

17. The method of claim 10, further comprising:
prioritizing, by the FTL controller, the third FTL table for retrieving logical-to-physical mapping data during a normal boot sequence; and
prioritizing, by the FTL controller, the first FTL table for retrieving logical-to-physical mapping data during an emergency boot sequence.

18. The method of claim 13, wherein the FTL controller determines that the third FTL table is corrupted based on a number of error correction code (ECC) errors encountered when accessing the third FTL table and a predetermined threshold.

* * * * *